Figures 3, 4:
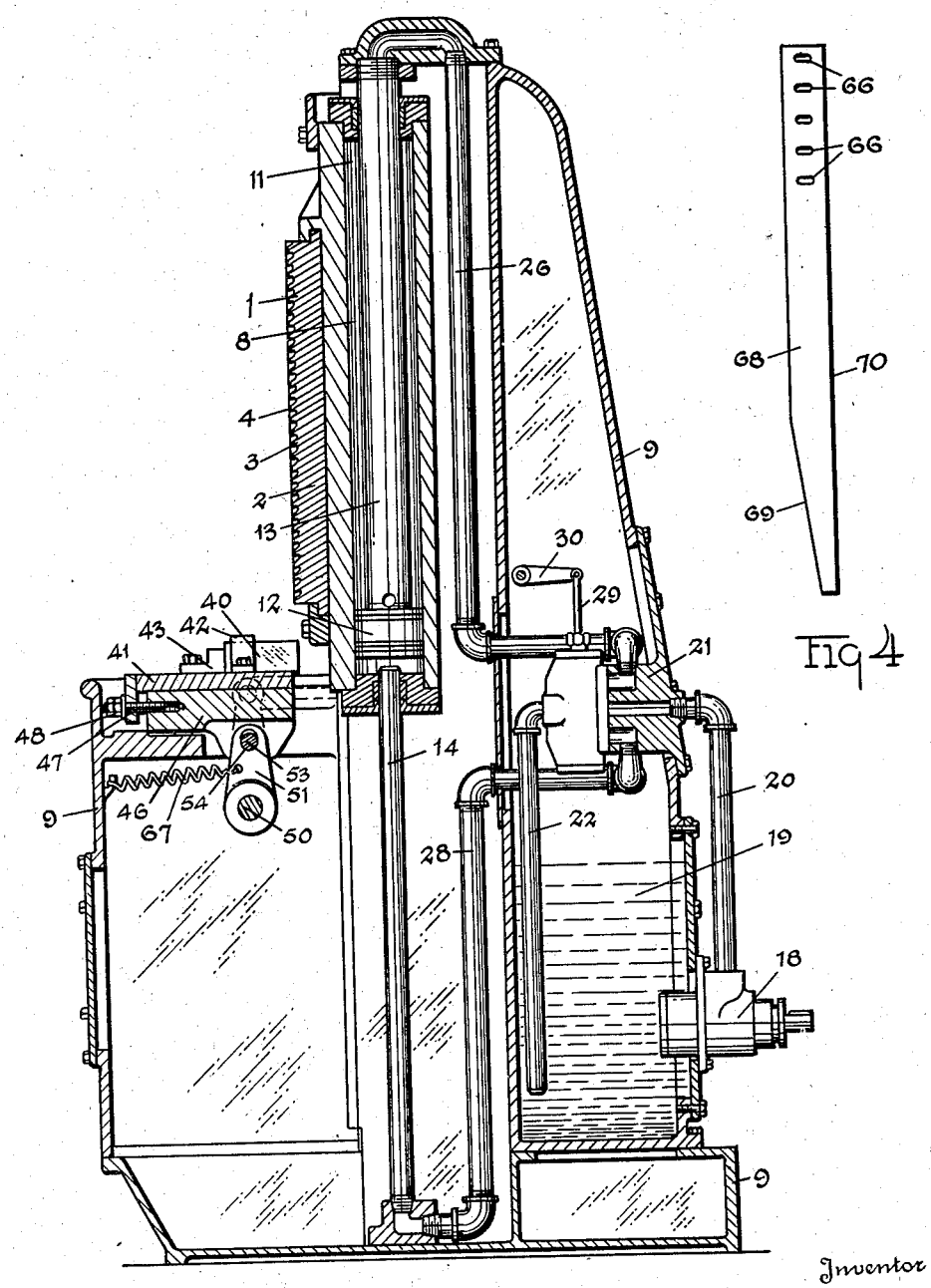

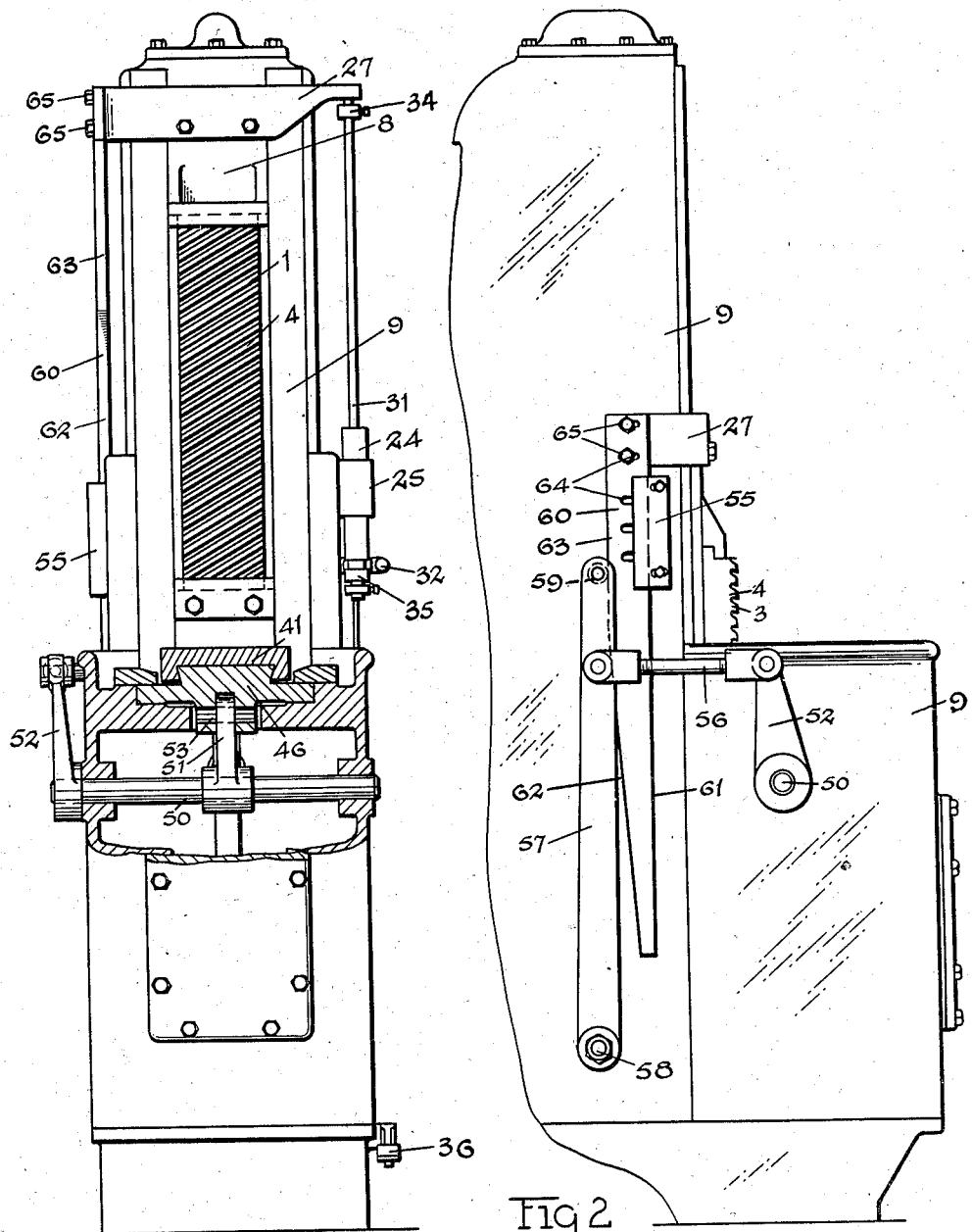

May 19, 1936.  F. J. LAPOINTE  2,041,551
SURFACE BROACH
Filed Dec. 31, 1934  2 Sheets-Sheet 2

Inventor
Francis J. Lapointe
By Faust & Crampton
Attorney

Patented May 19, 1936

2,041,551

UNITED STATES PATENT OFFICE 2,041,551

SURFACE BROACH

Francis J. Lapointe, Ann Arbor, Mich.

Application December 31, 1934, Serial No. 759,858

3 Claims. (Cl. 29—95.1)

My invention has for its object to provide a broach having teeth whose edges are located in a plane parallel to the major central axis of the broach and means for shaping articles by the use of the broach.

The invention provides an article-supporting member located contiguous to a broach-supporting member and means for reciprocating the members in directions at right angles to each other to produce progressive cutting of the work by the broach.

Thus, the invention provides a machine having means for moving a slidable article-supporting member at a rate proportional to the movement of the broach, whereby there is produced a progressive broach-cutting operation on the article to cut and surface-finish the article to a desired depth.

The invention provides an elongated broaching plate having cutting edges extending in parallel lines and located in a common plane, which enables manufacture of the broach at an exceedingly low cost since the teeth may all be formed alike and the edges of the teeth may be easily ground. It eliminates the required step-by-step gradient change to dimensions of the teeth of broaches commonly used in the art.

The invention also provides means for varying the ratio of the rate of movement of the article to that of the broach to produce cutting per unit of depth by the desired number of teeth of the broach and then, if desired, a surface finishing by a desired number of teeth, or if desired, removal of the work from the broach entirely upon completion of the cutting operation, or if desired, removal of the work from the broach after surfacing by a desired number of teeth of the broach. Thus, fewer teeth may be used for broach-cutting soft metal or a larger number of teeth may be used to cut harder metal to the same depth. In the first instance a large amount of the material is removed in the cutting operation of each tooth, and in the second instance, a smaller amount of material is removed by each tooth.

The invention also provides an adjustable, movable member having surfaces that move the work relative to the broach as may be desired to produce cutting and finishing of the work according to the character of the metal or material of which the work is composed.

The invention also provides means that maintains a constant number of broach teeth in contact with the article during the cutting operation and eliminates the vibration and jarring caused by the sequential engagement of a variable number of broaching teeth. Where the work is movably supported on a sliding member, the effect of jarring or bumping is accentuated.

The invention may be contained in structures of different forms without departing from the spirit of the invention, and to illustrate a practical application of the invention, I have selected a broaching machine embodying the invention as an example of the various structures containing the invention and shall describe the broaching machine selected hereinafter. The structure selected is shown in the accompanying drawings.

Fig. 1 illustrates a front view of the broaching machine, a part being shown in section. Fig. 2 illustrates a side view of the broaching machine. Fig. 3 illustrates a view of a vertical section of the broaching machine. Fig. 4 illustrates a modified form of cam that may be used for regulating the movement of the work relative to the broach.

In the particular form of the construction shown in the drawings, the broach 1 is made in the form of a rectangular plate 2 and a plurality of broach cutting teeth 3 having the usual tool clearance and chip clearance is formed in a side part thereof. The edges 4 of the teeth are located in a plane parallel to the side of the broach plate opposite to that in which the teeth are formed.

The broach is secured to, and moved by, a vertical reciprocating slide 8 that is slidably supported in suitable ways formed in the frame 9. The slide 8 may be formed to have a cylinder part 11 in which is located a fixed piston 12 supported upon a tubular member 13 that extends through one end of the cylinder part 11 and is secured to the frame 9. A second tubular member 14 extends into the cylinder part 11 through the other end of the cylinder. The tubular members 13 and 14 have openings at their ends near the fixed piston 12 and communicate with a source of supply of oil under pressure, such as may be created by the pump 18, which operates to draw oil from the reservoir 19 and force it under pressure to one side or the other of the fixed piston 12 to reciprocate the slide 8.

The pump 18 is connected through a pipe 20 to a suitable reversible slide valve 21 of a type well known in the art and which directs the oil under pressure to one side or the other of the fixed piston and receives the oil from the side of the piston opposite to that to which it is directed. The valve 21 has a connection through the pipe 22 to the reservoir to conduct the oil returned to the valve 21 from the cylinder to the reservoir. The valve 21 is connected to the tubular member 13 by means of the pipe 26 and to the pipe 14 by means of the pipe 28.

The valve 21 may be operated by a foot lever or a hand lever or automatically by adjustable members that move with the slide 8 to alter the direction of movement of the slide. A rod 29 is connected to the movable member of the valve and to a bell crank lever 30 having an arm 32 (Figs. 1 and 3). The lever 30 may be actuated to operate the valve by means of a rod 31 that is connected to the slide 8 by means of the bracket 27. The rod 31 is slidably supported in a sleeve 24 that is in turn slidably supported in a bracket 25. The rod 31 is provided with the blocks 34 and 35 that may be adjustably located on the rod 31. Upon the descent of the rod the block 34 engages the sleeve 24 at the desired point in its movement and moves the lever arm 32 to reverse the flow of the oil through the valve 21, and at a desired point of the ascent of the rod the block 35 engages the lever arm 32 and moves the valve to its neutral point to close the connection to the cylinder part 11 and short circuit the oil from the pump to the reservoir and thus bring the slide 8 to a stop in the manner well known in such constructions. The slide 8 may be again started down by the actuation of the pedal lever 36 or other suitable means that raises the arm 32 and the sleeve 24, which shifts the slide member of the valve 21 to connect the pump 18 with the lower end of the cylinder part 11 and causes the descent of the broach plate, as is common in fluid pressure-operated broach machines.

Thus, the engaging blocks 34 and 35 may be adjustably positioned along the rod 31 to adjust the working stroke of the slide 8 and reverse its movement and return it to its original position.

The work is placed in position to be cut by the broach during or upon the completion of its return stroke. The work 40 is secured to an adjustable plate 41 by any suitable fixture, such as the U-bar 42 and the stop 43, and so as to overhang the inner end of the plate 41. The plate 41 is supported upon the slidable bed or table 46 and may be locked in an adjusted position with reference to the table 46 by means of the stud bolt 47 and the lock nuts 48.

The table may be operated by any suitable means that will move the table at a rate proportionate to the rate of movement of the broach 1 to produce an inward movement of the work toward the broach as the broach descends in response to the operation of the pressure pump 18 as controlled by the valve 21. The progressive, inward movement is produced by means of a shaft 50 having a pair of arms 51 and 52 that are connected to the shaft 50 supported in bearings formed in bosses located on the side walls of a part of the frame of the machine. The arm 51 is connected to the table 46 by means of a pin 53 that may be located in the slot 54 formed in the arm 51 to enable translation of the oscillatory movement of the arm 51 to the longitudinal movement of the table 46. The arm 52 is connected by means of a link 56 to a lever 57 pivotally supported on the frame of the machine by means of the pin 58. The lever 57 has a roller 59 located in one end thereof and engaged by the edge of a cam bar 60. The bar is connected to the slide 8 by means of the bracket 27. An edge part 61 of the bar slides in a channelled block 55 secured to the frame 9 of the machine opposite the roller 59. The bar is provided with a sloping edge part 62 that engages the roller 59 to rock the lever 57 and slidably move the bed 46 towards the broach as the broach descends. The bar is also preferably provided with an edge part 63 that extends parallel to the edge 61. The edge part 63 extends upward from the edge part 62 and operates to hold the work against the teeth of the broach to produce a smooth, finished surface on the work after the cutting operation is completed. For purposes of adjustment the cam bar 60 is provided with a plurality of equally spaced slots 64, and the bolts 65 that connect the cam bar with the bracket 27 may be located in any two of the slots 64.

When the broach reverses, the bed 46 is returned by means of a spring 67 that may be connected to the arm 51 and the frame 9 of the machine.

Where softer metals are to be operated on by the broach, the cam bar 60 may be replaced by a cam bar that will move the work toward the broach at a faster rate than the cam bar 60 to cause the softer metal to be cut more rapidly per unit of length of movement of the broach. Thus, the cam bar 60 may be replaced by the cam bar 68 shown in Fig. 4. The cam bar 68 has a sloping edge part 69 that is inclined at a sharper angle to the edge part 70 than the sloping edge part 62 is inclined to the edge part 61 of the cam bar 60, which will cause a more rapid inward movement of the work proportionate to the vertical movement of the broach. The cam bar 68 is also provided with a plurality of equally spaced slots 66 that enable adjusted connections with the bracket 27 by the bolts 65.

The broach 1 is preferably provided with parallel teeth whose edges are inclined at a relatively large angle to the horizontal, such as 20° or 30°, in order to produce a shearing action on the metal as the broach is moved downward relative to the fixture. This is of particular advantage when used in connection with a machine wherein the work is supported upon a movable support. As is well known, where the edges of the teeth extend horizontally, the number of teeth engaging the work is constantly changing by one as the teeth move over the work, which produces bumping and vibration, which is accentuated where work is supported on a movable member. By inclining the teeth 20° or 30° the shear is maintained substantially constant, and bumping and resultant vibration are avoided, and also a uniform resistance to the cutting operations is produced. The machine is thus enabled to operate under a uniform fluid pressure during the cutting part of the stroke.

The work is set so as to be engaged by the lower teeth of the broach as the broach descends and is moved inward by the operation of the cam bar connected to the slide 8. When the roller 59 of the lever 57 passes from the sloping edge part 62 to the edge part 63 of the cam bar, a part or all of the remaining teeth of the broach, depending on the length of the stroke, operates to glaze and finish the surface of the work. The broach may be reversed in its movement at any time as may be desired according to the setting of the block 34 that operates the valve 21 through the lever 30. It may be stopped by the block 35 that engages the arm 32 of the lever 30, whereupon work may be replaced on the plate 41. The valve may then be operated to cause the descent of the broach. The blocks 34 and 35 may be located at any point along the rod 31. and the cam bars 60 and 68 may be adjustably located with reference to the bracket 27 by means of the openings 64 and 66 respectively and the bolts 65, and the work may be positioned on any part of the plate 41 in a lateral direction to utilize selectively any part of the broach plate that may be desired.

Thus, the invention greatly increases the utility of a surface broach and provides a broach which is so formed that it may be cheaply constructed and easily resharpened.

I claim:

1. An oblong broach member for broach cutting work, and having a broad rear plane surface and parallel teeth extending across the face of the member, the cutting edges of the teeth located in a common plane parallel to the rear plane surface of the member and operative to broach cut the work by progressive movements of both the broach and work in directions transverse to each other.

2. An oblong broach member for broach cutting work and having a relatively broad rear plane surface and parallel cutting teeth extending across the face of the broach member, the cutting edges of the teeth located in a plane parallel to the rear surface and inclined to the direction of the major axis of the broach member and operative to broach cut the work by progressive movements of both the work and the broach towards each other and in directions transverse to each other.

3. An oblong rectangular member for broach cutting work, the broach member having parallel teeth extending across the face of the member, the edges of the teeth located in a common plane and operative to cut the work by simultaneous progressive movements of both the broach and the work in directions transverse to each other, the plane of the teeth of the broach being located parallel to the direction of movement of the broach member.

FRANCIS J. LAPOINTE.